US008392141B2

(12) United States Patent
Wigen (10) Patent No.: US 8,392,141 B2
(45) Date of Patent: Mar. 5, 2013

(54) TOTAL AIR TEMPERATURE PROBE AND METHOD FOR REDUCING DE-ICING/ANTI-ICING HEATER ERROR

(75) Inventor: Scott John Wigen, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 408 days.

(21) Appl. No.: 12/610,804

(22) Filed: Nov. 2, 2009

(65) Prior Publication Data

US 2011/0106475 A1    May 5, 2011

(51) Int. Cl.
G01K 15/00 (2006.01)
G01F 13/00 (2006.01)
G01P 5/00 (2006.01)

(52) U.S. Cl. ........................ 702/99; 73/170.12
(58) Field of Classification Search .................... 702/99, 702/104; 73/170.12
See application file for complete search history.

(56) References Cited

U.S. PATENT DOCUMENTS

| D180,878 S | 8/1957 | Latham |
| 2,970,475 A | 2/1961 | Werner |
| 3,167,960 A | 2/1965 | Miesiak |
| 3,368,406 A | 2/1968 | Himebaugh |
| 3,512,414 A | 5/1970 | Rees |
| 4,036,054 A | 7/1977 | Goulet |
| 4,047,379 A | 9/1977 | Brookes et al. |
| 4,152,938 A | 5/1979 | Danninger |
| 4,206,645 A | 6/1980 | Orcutt |
| 4,275,603 A | 6/1981 | Kalocsay |
| 4,403,872 A | 9/1983 | DeLeo et al. |
| 4,458,137 A | 7/1984 | Kirkpatrick |
| 4,821,566 A | 4/1989 | Johnston et al. |
| 5,043,558 A | 8/1991 | Byles |

(Continued)

FOREIGN PATENT DOCUMENTS

| DE | 1925902 | 12/1969 |
| EP | 1457765 A1 | 9/2004 |

(Continued)

OTHER PUBLICATIONS

Stickney, T. M. "Total Temperature Sensors, Technical Report 5755, Revision C", Rosemount Aerospace/BFGoodrich, pp. 2-28, Jan. 1994.

(Continued)

*Primary Examiner* — Michael Nghiem
*Assistant Examiner* — Manuel Rivera Vargas
(74) *Attorney, Agent, or Firm* — John D. Veldhuis-Kroeze; Westman, Champlin & Kelly, P.A.

(57) ABSTRACT

A method of reducing de-icing heater error (DHE) in total air temperature (TAT) probes is provided. Using the method, a nominal DHE function is obtained for a particular type of TAT probe, with the nominal DHE function having been derived from a plurality of TAT probes of the particular type. A probe specific correction coefficient is calculated for an individual TAT probe of the particular type as a function of a measured DHE at a first airflow and a predicted DHE at the first airflow. The predicted DHE at the first airflow is determined using the nominal DHE function derived from the plurality of TAT probes of the particular type. The probe specific correction coefficient is then stored for later use, or used to determine DHE with the individual TAT probe over a range of airflows as a function of the probe specific correction coefficient.

20 Claims, 7 Drawing Sheets

U.S. PATENT DOCUMENTS

| | | | |
|---|---|---|---|
| 5,302,026 | A | 4/1994 | Phillips |
| 5,466,067 | A | 11/1995 | Hagen et al. |
| 5,628,565 | A | 5/1997 | Hagen et al. |
| 5,653,538 | A | 8/1997 | Phillips |
| 5,731,507 | A | 3/1998 | Hagen et al. |
| 6,070,475 | A | 6/2000 | Muehlhauser et al. |
| 6,076,963 | A | 6/2000 | Menzies et al. |
| 6,370,450 | B1 | 4/2002 | Kromer et al. |
| 6,452,542 | B1 | 9/2002 | Bachinski et al. |
| 6,543,298 | B2 | 4/2003 | Cronin et al. |
| 6,609,825 | B2 | 8/2003 | Ice et al. |
| 6,622,556 | B1 | 9/2003 | May |
| 6,651,515 | B2 | 11/2003 | Bernard |
| D497,114 | S | 10/2004 | Willcox |
| 6,817,240 | B2 | 11/2004 | Collot et al. |
| 6,840,672 | B2 | 1/2005 | Ice et al. |
| 6,941,805 | B2 | 9/2005 | Seidel et al. |
| 6,974,250 | B2 | 12/2005 | Severson |
| 7,036,365 | B2 | 5/2006 | Choisnet |
| 7,114,847 | B2 | 10/2006 | Simeon |
| 7,174,782 | B2 | 2/2007 | Ice |
| 7,357,572 | B2 | 4/2008 | Benning et al. |
| 7,416,329 | B2 | 8/2008 | Severson |
| 7,441,948 | B2 | 10/2008 | Bernard et al. |
| D587,610 | S | 3/2009 | Benning et al. |
| 2003/0010109 | A1 * | 1/2003 | Cronin et al. ............... 73/170.12 |
| 2003/0058919 | A1 | 3/2003 | Ice et al. |
| 2004/0037348 | A1 * | 2/2004 | Ice et al. ..................... 374/138 |
| 2004/0177683 | A1 | 9/2004 | Ice |
| 2004/0237641 | A1 | 12/2004 | Hanson et al. |
| 2005/0193812 | A1 | 9/2005 | Ice |
| 2007/0064766 | A1 | 3/2007 | Benning |
| 2007/0107510 | A1 * | 5/2007 | Agami et al. .................. 73/182 |

FOREIGN PATENT DOCUMENTS

| | | |
|---|---|---|
| FR | 2808874 | 5/2000 |
| WO | 9402814 A1 | 2/1994 |
| WO | 0144821 A1 | 6/2001 |

OTHER PUBLICATIONS

Search Report dated Feb. 23, 2007, issued by the European Patent Office in Application No. 06251712.3.

Partial Search Report dated Apr. 9, 2008, issued by the European Patent Office in Application No. 08251700.4.

Extended Search Report dated Mar. 10, 2010, issued by the European Patent Office in Application No. 08251700.4.

* cited by examiner

TOTAL AIR TEMPERATURE PROBE AND METHOD FOR REDUCING DE-ICING/ANTI-ICING HEATER ERROR

BACKGROUND

Disclosed embodiments relate to total air temperature (TAT) probes or sensors. More particularly, the present embodiments relates to improving deicing heater error (DHE) performance in TAT probes.

Modern jet powered aircraft require very accurate measurement of outside air temperature (OAT) for inputs to the air data computer, engine thrust management computer, and other airborne systems. For these aircraft types, their associated flight conditions, and the use of total air temperature probes in general, air temperature is better defined by the following four temperatures: (1) Static air temperature (SAT) or ($T_S$), (2) total air temperature (TAT) or ($T_t$), (3) recovery temperature ($T_r$), and (4) measured temperature ($T_m$). Static air temperature (SAT) or ($T_S$) is the temperature of the undisturbed air through which the aircraft is about to fly. Total air temperature (TAT) or ($T_t$) is the maximum air temperature that can be attained by 100% conversion of the kinetic energy of the flight. The measurement of TAT is derived from the recovery temperature ($T_r$), which is the adiabatic value of local air temperature on each portion of the aircraft surface due to incomplete recovery of the kinetic energy. Temperature ($T_r$) is in turn obtained from the measured temperature ($T_m$), which is the actual temperature as measured, and which differs from recovery temperature because of heat transfer effects due to imposed environments. For measuring the TAT, TAT probes are well known in the art. These probes can be of a wide range of different types and designs, and can be mounted on various aircraft surfaces which expose the TAT probe to airflow. For example, common TAT probe mounting locations include aircraft engines and aircraft fuselages.

Conventional TAT probes, although often remarkably efficient as a TAT sensor, sometimes face the difficulty of working in icing conditions. Anti-icing performance is facilitated by heater elements embedded in or around the housing walls of TAT probes or from hot air flowing through the probes (e.g., from an aircraft engine). Unfortunately, external heating also heats the internal boundary layers of air which, if not properly controlled, provide an extraneous heat source in the measurement of TAT. The heat used to de-ice TAT probes causes an error in the temperature reading known as de-icing heater error (DHE). Deicing Heater Error is difficult to correct for.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of reducing de-icing heater error (DHE) in total air temperature (TAT) probes is provided. Using the method, a nominal DHE function is obtained for a particular type of TAT probe, with the nominal DHE function having been derived from a plurality of TAT probes of the particular type. A probe specific correction coefficient is calculated for an individual TAT probe of the particular type as a function of a measured DHE at a first airflow and a predicted DHE at the first airflow. The predicted DHE at the first airflow is determined using the nominal DHE function derived from the plurality of TAT probes of the particular type. The probe specific correction coefficient is then stored for later use, or used to determine DHE with the individual TAT probe over a range of airflows as a function of the probe specific correction coefficient.

DETAILED DESCRIPTION

The heat used to de-ice total air temperature (TAT) probes causes an error in the temperature reading known as de-icing heater error (DHE). The DHE varies with flow and can be characterized by a multi-point wind tunnel test. By testing a number of probes of a particular type, an average or nominal DHE correction curve or function can be developed for a particular probe design. This single relationship defined by the DHE correction curve or function is then typically used to apply a DHE correction for all probes in the defined probe family. This corrects the majority of errors, but does not capture the probe to probe variation within the family. This uncertainty results from subtle part and manufacturing variability.

Figure 1:
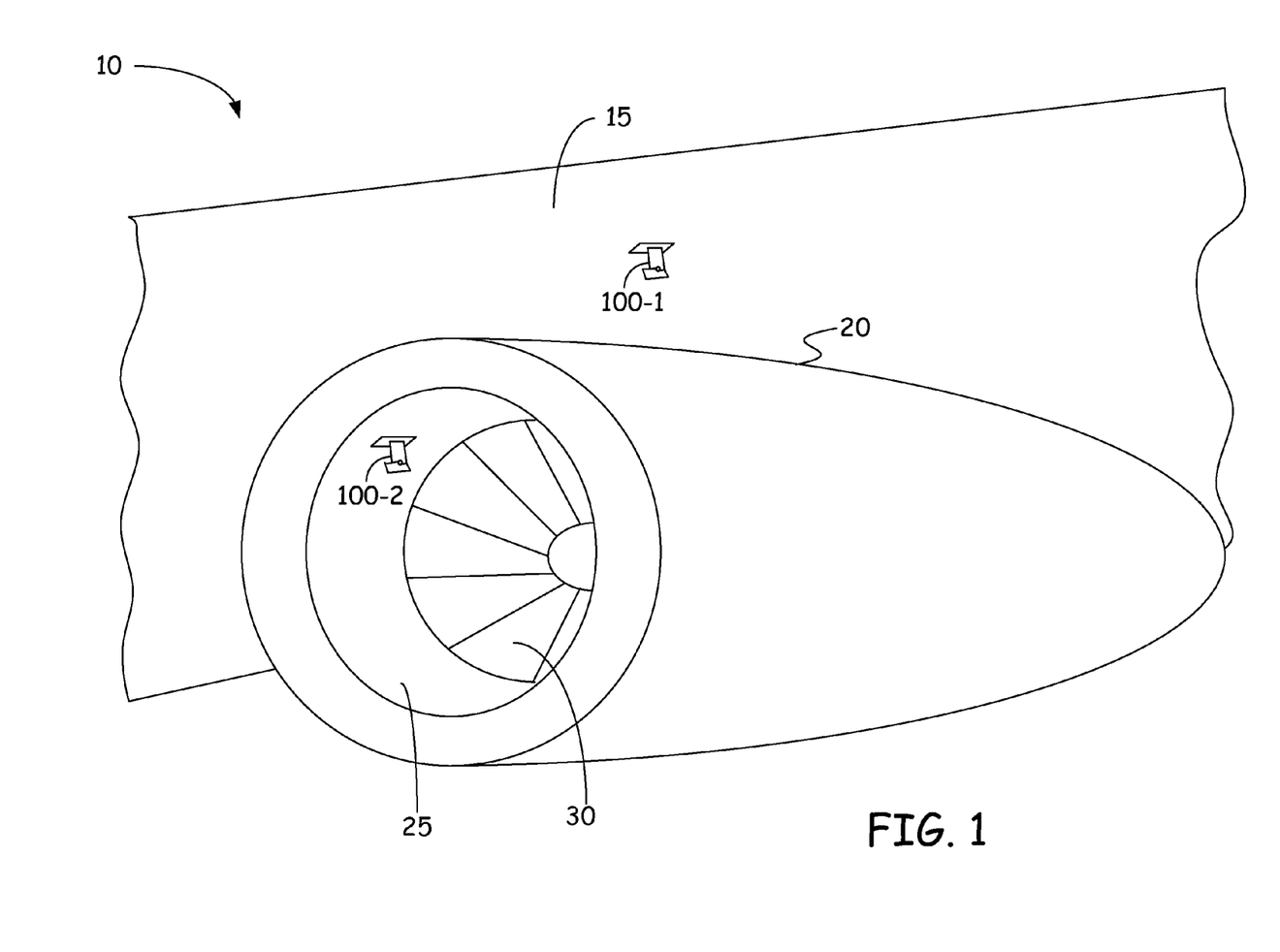
FIG. 1 is a diagrammatic perspective view of TAT probes, in accordance with example embodiments, mounted to aircraft surfaces.
Figure 3:
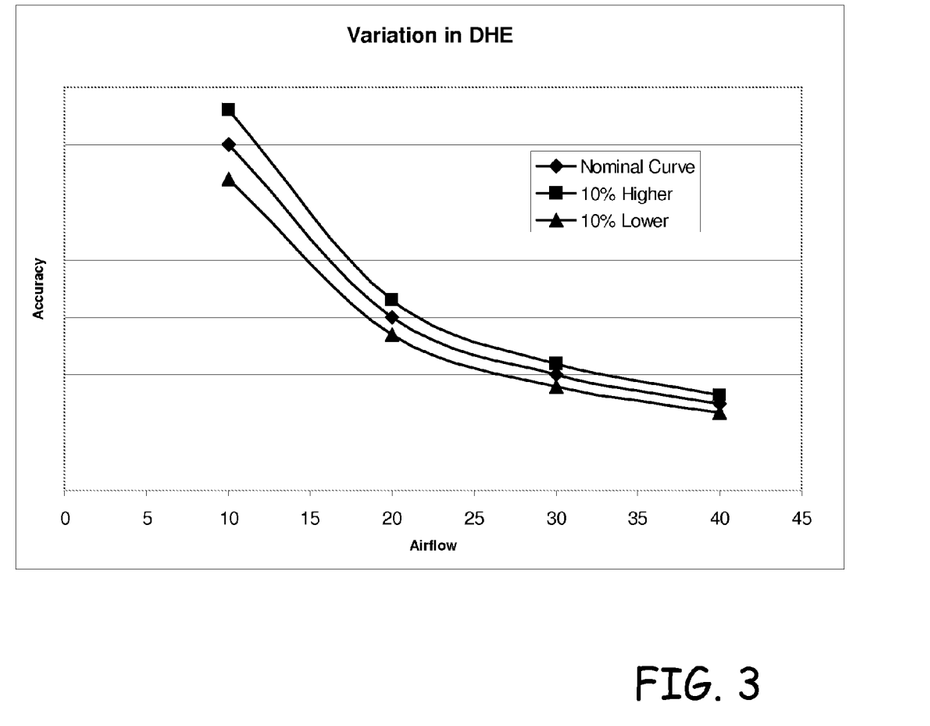
FIG. 3 is a graph illustrating DHE as a function of airflow for a nominal curve, and for probes measuring +/−10% from nominal.

Disclosed embodiments provide an efficient method for deriving a probe specific DHE versus flow relationship, which improves TAT measurement accuracy by correcting out the DHE for each probe instead of relying only on the nominal family curve to provide the correction. Thus, errors are reduced significantly. As discovered and described below, if desired, using the disclosed methods only a single point steady state airflow measurement of DHE is needed to correct out errors across multiple flows. Of course, the disclosed methods can be extended to include multiple point airflow measurements in other embodiments. Also disclosed are methods of determining the DHE while on an engine or aircraft FIG. 3 is a diagrammatic perspective view of example surfaces of an aircraft 10 on which TAT probes 100 can be mounted. The specific locations at which TAT probes 100 are shown mounted in FIG. 1 are provided for illustrative purposes only, and are not intended to designate exact mounting locations in any particular use of TAT probes 100. As shown in FIG. 1, aircraft 10 includes a fuselage 15 and an aircraft engine 20. The fuselage mounted TAT probe is designated 100-1, while the engine mounted TAT probe is designated 100-2. Frequently, fuselage and engine mounted TAT probes are of different types and configurations, but discussions provided herein are intended to cover any type of TAT probe which mounts to an aircraft, and the generic reference number 100 applies to any of these types (e.g., to include probes 100-1 and 100-2). While TAT probes 100 can be positioned or mounted on other surfaces of aircraft 10, in this particular embodiment, TAT probes are shown mounted to the skin of fuselage 15 and to surface 25 of engine 20. For the engine mounted TAT probe, surface 25 forms part of the inlet portion of engine 20, upstream of fan blades 30. Other aircraft engine surfaces can also be used. To reiterate, disclosed embodiments are not limited to TAT probes mounted to surfaces of aircraft engines or to any particular fuselage location, but instead apply more generally to TAT probes mounted to any aircraft surfaces for purposes of measuring TAT. The disclosed methods can also be used with TAT probes tested in a wind tunnel, prior to mounting on an aircraft, if desired.

Figure 2:
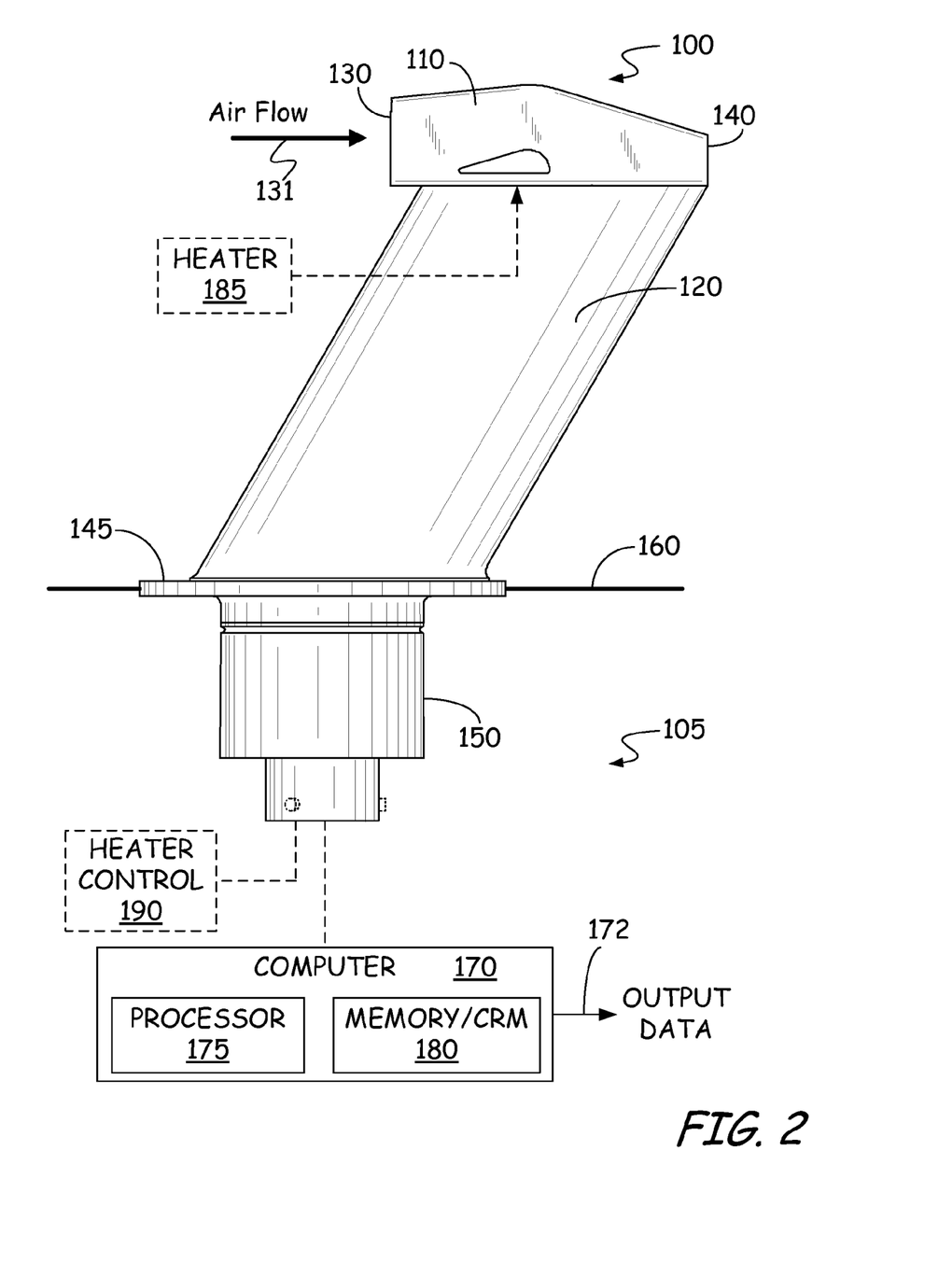
FIG. 2 is a diagrammatic representation of a TAT probe and a probe system in accordance with example embodiments.

FIG. 2 is a side view illustration of an example embodiment of a TAT probe 100, which is configured to be mounted to an aircraft surface such as the ones shown in FIG. 1. Also shown in FIG. 2 is a TAT probe system 105 including TAT probe 100 and a computer or other processing circuitry configured to implement steps described below. TAT probe 100 includes a head 110 supported by a strut 120. Head 110 has an airflow inlet 130 and a main airflow exit or exit channel 140. Airflow enters airflow inlet 130, which is also referred to as an inlet scoop, moving in a direction relative to probe 100, the direction for example as represented by arrow 131. When aircraft 10 is moving in a direction having a forward component, TAT probe 100 is moving in a direction which has a component opposite to the direction of arrow 131. A portion of the airflow entering airflow inlet 130 will exit through main airflow exit 140. In many TAT probe designs, another portion of the airflow entering inlet 130 will be diverted into a sensor flow passage (not shown) on the interior of TAT probe 100, where a TAT sensor (not shown) is positioned for making a TAT measurement. Disclosed embodiments are not limited to any particular TAT probe configuration or TAT sensor design, and therefore, the interior of TAT probe 100 is not shown.

As shown in FIG. 2, TAT probe 100 frequently also includes a mounting flange 145 used to mount the probe to an aircraft surface 160 (e.g., such as a surface of fuselage 15 or engine 20). Also shown in FIG. 2 is an electronics housing 150 which can be included with probe 100. Housing 100 can house connectors and electrical components used to process measurements made by TAT probe 100, communicate TAT or other information with other aircraft electronics, control heater components 185 to turn on/off heat applied to the probe, etc.

In FIG. 2, heater 185 is shown diagrammatically in block diagram form. As is well known in the art, heater 185 is typically internal to probe 100 and is used to heat particular interior/external surfaces of the probe to prevent or minimizing the effects of icing conditions on probe performance. Heater 185 can also be external from the probe. Heater 185 can also be replaced with hot air from an external source (e.g., from an aircraft engine) to de-ice/anti-ice the probe. As used herein, references to controlling the probe heater or probe heat are intended to represent controlling any source of heat which can be applied to the probe for de-icing/anti-icing functions. Heater control electronics 190 electrically coupled to the heater 185 can be positioned in housing 150, or can be positioned elsewhere in the aircraft. Heater control electronics 190 includes components used to turn on/off heat applied to the probe through heater 185.

Also shown in FIG. 2 is computer 170 having one or more processors or processing circuitry 175 and memory or computer readable medium 180. The one or more processors or processing circuitry (collectively referred to as "processor 175" hereafter) are configured or configurable to control operation of TAT probe 100, to process measurements from TAT probe 100, and/or to communicate with other aircraft electronics. Memory or computer readable medium 180 (referred to as "memory 185" hereafter) store computer executable instructions for configuring processor 175 to implement these tasks, including implementing method steps described below. Using the computer executable instructions to implement the various method steps includes, in some embodiments, configuring processor 175 such that the configured processor forms an apparatus which performs the method steps. While shown as a separate component, memory 180 can be memory embedded within processor 175 in some embodiments. Memory 180 can also store intermediate or final values, functions, constants, etc., used in the methods described herein. Also, heater control electronics 190 can be combined with processor 175 such that processor 175 performs some or all of the heater control functions.

As shown in FIG. 2, computer 170 also includes an output 172 through which output data is provided to other systems on the aircraft. The output data can include, for example, intermediate or final values, functions, constants, etc., used in the methods described herein. Computer 170 can be positioned in housing 150 of probe 100 in some embodiments. However, due in part to the harsh environment in which TAT probes operate, computer 170 can instead be a flight data computer or other computer located inside of the aircraft. Computer 170 can also be, in the case of engine mounted TAT probes, an engine control computer. Of course, computer 170 will typically be configured or configurable to perform functions in addition to the ones described herein. Computer 170 and TAT probe 100 combine to form a TAT probe system in some disclosed embodiments.

Disclosed embodiments are based, in part, upon the discovery that probe specific DHE deviates from the nominal DHE for a probe family in a simple way. This allows subsequent individual TAT probes from that family to be characterized relative to the nominal DHE function or curve by using just a single steady state airflow test point, while the characterization can be applied for all flows or for a range of flows. This is made possible due to the discovery that, over a range of airflows, the accuracy of a given probe is very close to a fixed percentage higher or lower than the nominal family curve. The graph in FIG. 3 shows typical DHE curves for probes measuring +/−10% from nominal. In the graph of FIG. 3, the accuracy or DHE is airflow (lbs/ft$^2$·sec). As can be seen in FIG. 3, the difference from nominal of the DHE increases the most at lower airflows for both the 10% lower and the 10% higher probes, but the increase is not excessive, and characteristics of the curves relative to nominal allow the fixed percentage higher or lower than nominal assumption to be employed.

In real life application, a TAT probe is rarely exactly a given percentage away from the nominal curve across all flow ranges. However, each individual probe's DHE profile tends to either be always higher or always lower. If the offset is determined by test (either on aircraft, on engine or in a wind tunnel) and is known, then a greater portion of the error can be corrected out. Consider the following analysis:

Given:
x represents airflow;
F(x) is the nominal DHE (i.e., curve fit DHE) of a population of TAT probes as a function of airflow x;
K is the probe specific correction coefficient defined by the DHE for the probe measured at a specific flow point (or points) x divided by the DHE of an average population (e.g., the nominal DHE curve or $DHE_{CurveFit}$) at the same flow point x:

$$K = \frac{DHE_{Measured}}{DHE_{CurveFit}};$$

$E_S$ is error when using the standard F(x) curve;
$E_K$ is the error when using K adjusted curve;
$T_m$ is the temperature as measured by the sensor;
$T_t$ is the true total temperature;

$$E_S = F(x)) - T_t \text{ and } E_K = (T_m - K^*F(x)) - T_t$$

For an individual probe the $E_K$ will not always be less in magnitude than $E_S$ away from the measured DHE flow condition at the specific flow point. However, for a given population of probes the standard deviation of $E_K$ is less than $E_S$ across the flow range and very small at the measured location. Looking at historical data the standard deviation is observed to be 10-70% less across the flow range for the K factor correction type. This means that the uncertainty of $E_K$ is much less than $E_S$ and results in better total temperature accuracy performance. This is important because air data and engine controls need as accurate as possible total temperature readings.

Using processing circuitry such as processor 175, the nominal DHE function F(x) (e.g., defining $DHE_{CurveFit}$ over a range of airflows) can be obtained for a family of TAT probes of a particular type. The processing circuitry can then calculate the probe specific correction coefficient K for an individual TAT probe of the particular type as a function of the measured DHE ($DHE_{Measured}$) at a first airflow (e.g., a first steady state value of x) and a predicted DHE at the first airflow (e.g., F(x) at the first airflow). The processing circuitry can then use the probe specific correction coefficient K to determine DHE with the individual TAT probe over a range of airflows as a function of the probe specific correction coefficient. This can be done by multiplying F(x) by K to modify the nominal DHE function to generate a probe specific DHE function for the individual TAT probe or by otherwise altering the nominal DHE function using K. This can also be done by determining DHE using F(x), and then subsequently multiplying the determined DHE by K or by otherwise altering the determined DHE using K.

Another important discovery is a process or method for determining the correction factor K for individual probes. This method can be done in a wind tunnel and the coefficient K programmed into the engine/aircraft computer or into memory inside the TAT probe. However, measuring the DHE after the TAT probe has been mounted on an engine or on other aircraft surfaces is a more efficient process. By measuring the de-icing heater error on engine or on the aircraft, at a given flow (or any steady state condition), allows for a nearly part-for-part correction curve to be calculated by the engine control computer or flight data computer and then corrected out. This still provides the 10-70% reduction in standard deviation across the airflow range and it nearly eliminates the error at the measured flow condition (i.e., the airflow at which K is calculated for the probe). The computer (engine or flight) can calculate the probe specific correction coefficient using various techniques. For example, consider the following steps:

Engine/aircraft reaches a steady state condition either on the ground or in the air and saves the TAT measurement and the flow conditions (mass flow rate, density, Mach, velocity, Reynolds, etc).
The engine/flight computer turns on or off the probe heat.
The engine/flight computer waits a defined length of time (to account for the time response of the DHE change) for the probe to reach a steady state (e.g., to heat or cool to a steady state after the heat has been turned on/off).
The engine/flight computer records the new TAT reading.
The delta between the two TAT readings is that particular probe's DHE at that airflow.
The engine/flight computer can check this value by comparing it to the aircraft's other TAT probes if desired.
The engine/flight computer can again verify this de-icing heater error, if desired, by turning back on the heat (or by turning it back off), measuring TAT again, and determining the delta between the second and third TAT readings.
The correction factor, K, is determined by taking the probes measured DHE at that flow point and dividing it by the calculated nominal error curve DHE value at that same flow point stored in engine computer.

$$K = \frac{DHE_{Measured}}{DHE_{CurveFit}}$$

Using this correction factor the DHE is nearly fully corrected for at that defined airflow.
Multiplying the correction factor by the compensated average error curve (F(x) function discussed above) provides a better estimate of the DHE across all air flows.

Figure 4:
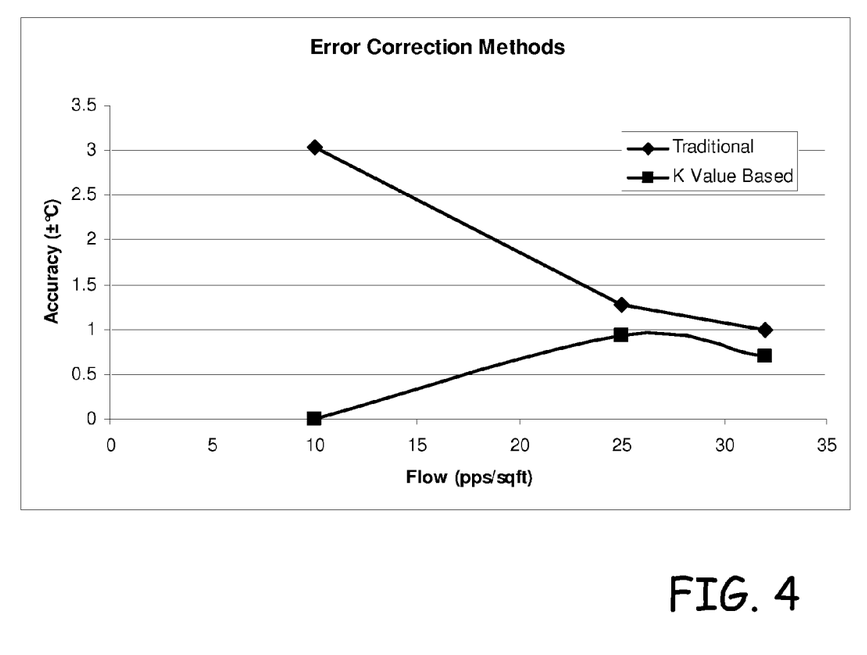
FIG. 4 is a graph illustrating the 3σ standard deviation of the DHE in ° C. as a function of flow rate for a conventional nominal curve based correction and for a correction coefficient based curve.

A visual representation of this shift is shown in the graph of FIG. 4. This graph plots the 3σ standard deviation of the DHE in ° C. as a function of flow rate (pps/ft²). The upper line (diamonds) represents the current technology accuracy for a particular probe population when only comparing the measured TAT to F(x). The lower line (squares) represents the new accuracy band of the measured TAT compared to what the flight or engine computer is correcting for using the K*F(x) curve. This graphically shows how the uncertainty of $E_K$ is reduced across all airflows (analysis of historical data shows a 10-70% improvement depending on the probe) compared to $E_S$ for the population of a given probe. At the measured flow the error will nearly drop to 0 (only limited by the initial accuracy and how steady state the measurement was taken at) but the improvement is still substantial across the entire flow range. The accuracy correction steps could be repeated at multiple steady state conditions (possibly on ground and while at cruise) to correct out additional errors. However, it is important to note that errors are greatly reduced even if DHE is only measured at a single point when calculating the probe specific correction coefficient K, and then K is used across all flow ranges. This provides a simple implementation while achieving significant improvement across a wide range of airflows. That benefit not withstanding, disclosed concepts can be extended to include calculating K using the above techniques repeated at multiple steady state airflows, calculating multiple values of K at multiple steady state airflows and then using the different values of K to modify F(x) over different ranges of airflow, calculating multiple values of K at multiple steady state airflows and then generating a curve-fit function to describe a variable relationship between K and airflow, etc. If desired, other manipulations of the probe specific correction coefficient K can be utilized, for example increasing or decreasing K as the flow increases. For example, based on limited data, it appears that increasing K by 2% if K<1 and decreasing K by 2% when K>1 may provide a slight increase in accuracy. However, more data is needed to determine if this applies to all probes. Other modifications of K are also possible.

Figure 5:
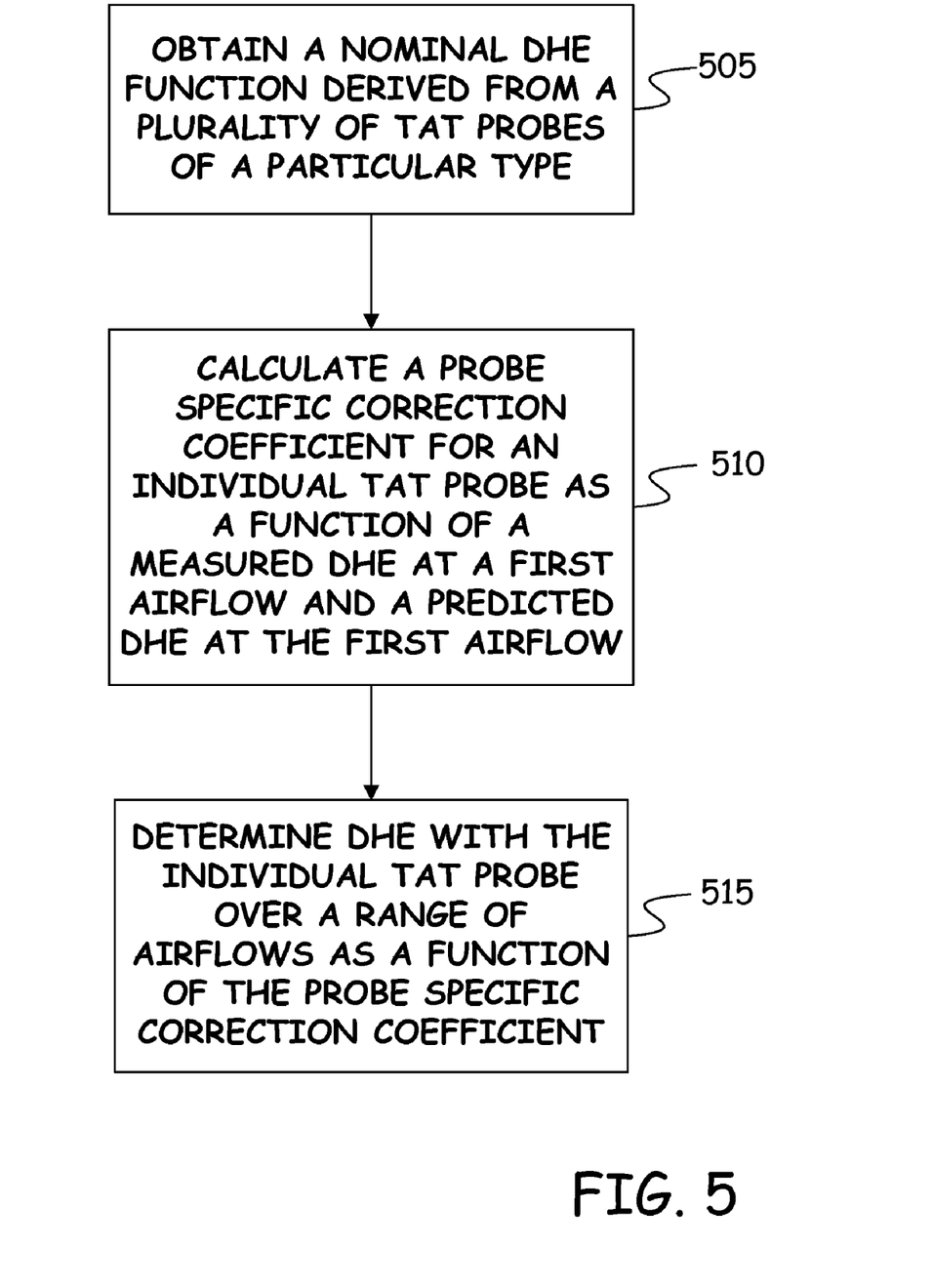
FIGS. 5-7 are flow diagrams illustrating method steps of some disclosed embodiments.

Referring now to FIG. 5, shown is a flow diagram representing some embodiments of the methods described above.

Disclosed embodiments are not limited, however, to the method shown in FIG. 5. The method of reducing DHE in FIG. 5 includes steps which can be implemented in suitably programmed processors/processing circuitry as described above.

At step 505, the method shown in FIG. 5 includes obtaining a nominal DHE function derived from a plurality of TAT probes of a particular type. The nominal DHE function can be stored in memory of the particular probe, stored in memory of a computer such as an air data computer or an engine computer, or otherwise provided. Next, at step 510, a probe specific correction coefficient is calculated for an individual TAT probe of the particular type as a function of a measured DHE at a first airflow and a predicted DHE at the first airflow. The predicted DHE at the first airflow is determined using the nominal DHE function derived from the plurality of TAT probes of the particular type. The probe specific correction coefficient for the individual TAT probe can be calculated while the individual TAT probe is mounted on the aircraft. The calculation can also be done at steady state airflow, either with the aircraft on the ground or with the aircraft flying at a substantially steady state condition.

Next, at step 515, DHE is determined with the individual TAT probe over a range of airflows as a function of the probe specific correction coefficient. This can include, for example, using the probe specific correction coefficient to modify the nominal DHE function to generate a probe specific DHE function for the individual TAT probe, and then determining DHE with the probe specific DHE function. Modifying the nominal DHE function to generate the probe specific DHE function can include multiplying the nominal DHE function by the probe specific correction coefficient. In other embodiments, step 515 can instead include using the probe specific correction coefficient for the individual TAT probe to modify DHE, after DHE is determined using the nominal DHE function derived from the plurality of TAT probes of the particular type.

Figure 6:
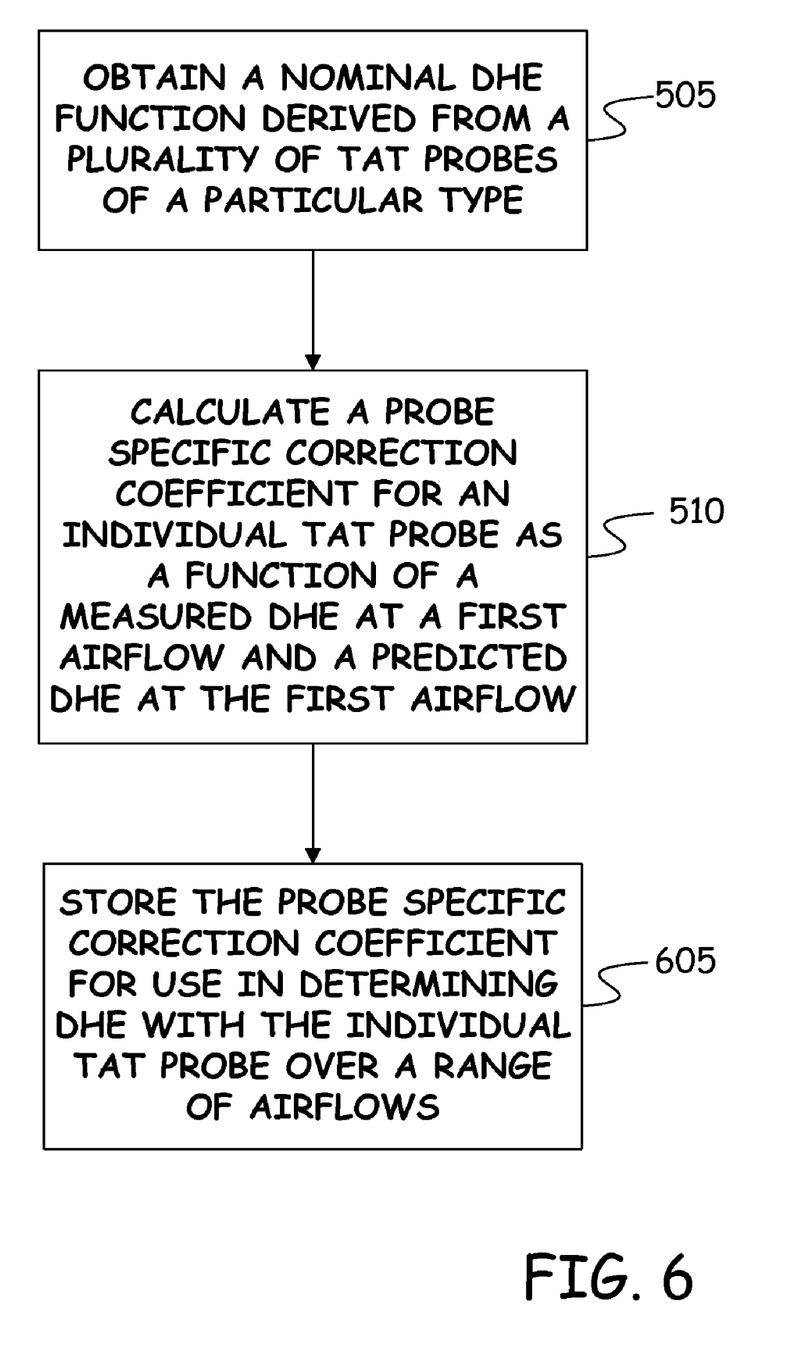

Referring now to FIG. 6, in some embodiments, a method of configuring a TAT probe system (e.g., system 105 shown in FIG. 2) is provided. The method of FIG. 6 can be identical to the method of FIG. 5, except that step 515 can be replaced with step 605. Thus, in this method, the probe specific correction coefficient is stored in memory of the probe or of the processing circuitry (e.g., memory 180 of processor 175) for later use by the processing circuitry in determining DHE with the individual TAT probe over a range of airflows as a function of the probe specific correction coefficient.

Figure 7:
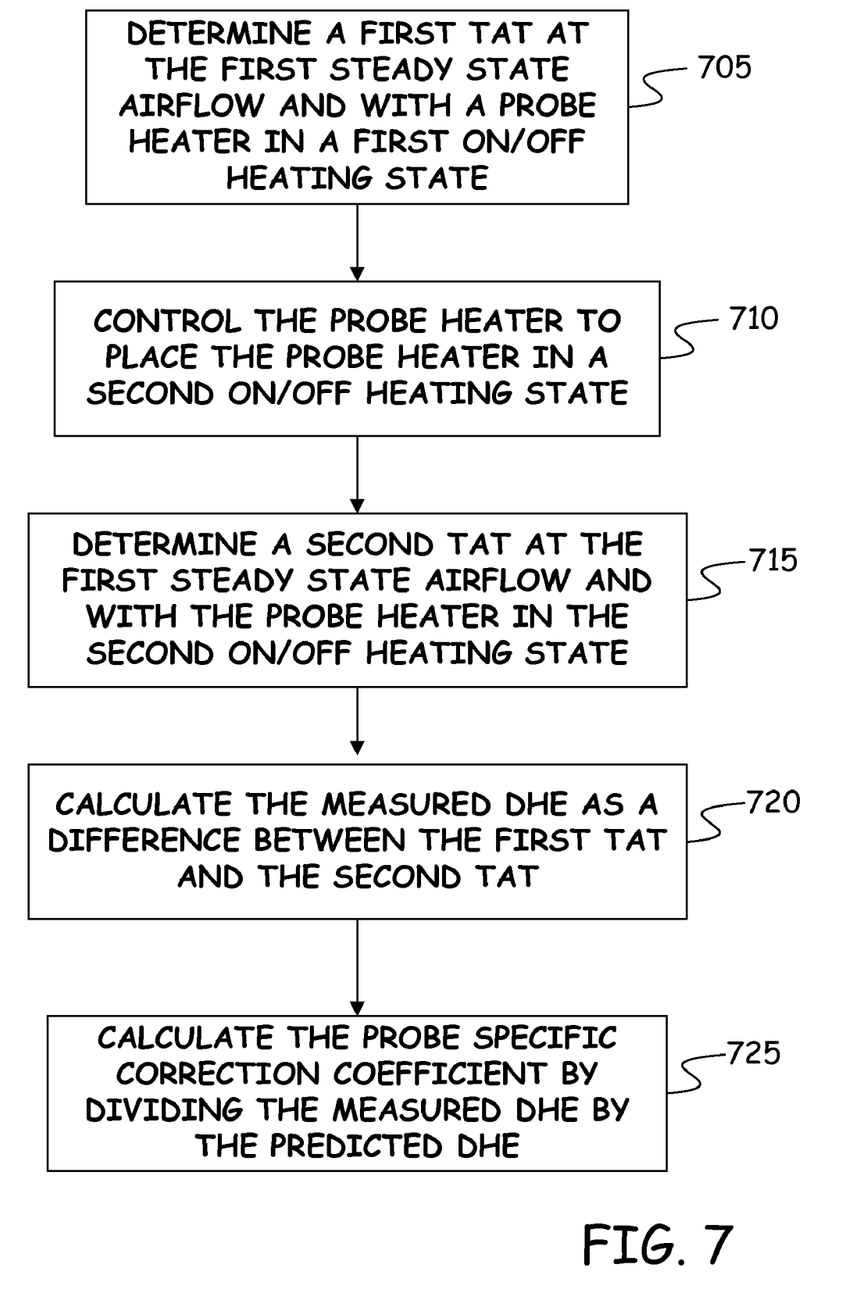

In an example embodiment, step 510 from FIG. 5 can be achieved using more specific steps illustrated in FIG. 7. As shown in FIG. 7, at step 705 the individual TAT probe and the processing circuitry can be used to determine a first TAT at the first steady state airflow and with a probe heater in a first on/off heating state (i.e., either with the probe heat on or off). Then, at step 710, the processing circuitry (i.e., including heater control 190) or other means is used to control the probe heater to place the probe heater in a second on/off heating state (i.e., to turn the probe heat off or on changing the state from its previous condition). At step 715, a second TAT is determined at the first steady state airflow and with the probe heater in the second on/off heating state. Before performing step 715, however, the method can include waiting a predetermined length of time to allow probe heat to reach a steady state condition (i.e., to cool off or heat up). Then, at step 720, the processing circuitry or other means can be used to calculate the measured DHE as a difference between the first TAT and the second TAT. Finally, the probe specific correction coefficient can be calculated by dividing the measured DHE by the predicted DHE at the first steady state airflow, as shown at step 725.

If desired, the method shown in FIG. 7 can be extended to verify the DHE prior to or after the calculation of the probe specific correction coefficient. For example, the method can be extended to include controlling the probe heater to place the probe heater back into the first on/off heating state, and then using the TAT probe and the processing circuitry to determine a third TAT at the first steady state airflow and with a probe heater again in the first on/off heating state. The processing circuitry can then calculate a verification measured DHE as a difference between the second TAT and the third TAT. The measured DHE using steps 705-725 can then be compared to the verification measured DHE to identify any error in the measured DHE.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of reducing de-icing heater error (DHE) in total air temperature (TAT) probes, the method comprising:
using processing circuitry to obtain a nominal DHE function derived from a plurality of TAT probes of a particular type;
using the processing circuitry to calculate a probe specific correction coefficient for an individual TAT probe of the particular type as a function of a measured DHE at a first airflow and a predicted DHE at the first airflow, the predicted DHE at the first airflow being determined using the nominal DHE function derived from the plurality of TAT probes of the particular type; and
using the processing circuitry to determine de-icing heater error with the individual TAT probe over a range of airflows as a function of the probe specific correction coefficient.

2. The method of claim 1, wherein using the processing circuitry to calculate the probe specific correction coefficient for the individual TAT probe of the particular type comprises calculating the probe specific correction coefficient for the individual TAT probe while the individual TAT probe is mounted on an aircraft, and with the first airflow being a steady state airflow.

3. The method of claim 2, wherein calculating the probe specific correction coefficient for the individual TAT probe while the individual TAT probe is mounted on the aircraft, and with the first airflow being a steady state airflow, further comprises calculating the probe specific correction coefficient while the aircraft is on the ground.

4. The method of claim 2, wherein calculating the probe specific correction coefficient for the individual TAT probe while the individual TAT probe is mounted on the aircraft, and with the first airflow being a steady state airflow, further comprises calculating the probe specific correction coefficient while the aircraft is flying at a cruising speed.

5. The method of claim 1, wherein using the processing circuitry to calculate the probe specific correction coefficient further comprises:
using the individual TAT probe and the processing circuitry to determine a first TAT at the first airflow and with a probe heater in a first on/off heating state, wherein the first airflow is a steady state airflow;

using the processing circuitry to control the probe heater to place the probe heater in a second on/off heating state;
using the individual TAT probe and the processing circuitry to determine a second TAT at the first steady state airflow and with the probe heater in the second on/off heating state;
using the processing circuitry to calculate the measured DHE as a difference between the first TAT and the second TAT; and
using the processing circuitry to calculate the probe specific correction coefficient by dividing the measured DHE by the predicted DHE at the first steady state airflow determined using the nominal DHE function for the plurality of TAT probes of the particular type.

6. The method of claim 5, and before using the individual TAT probe and the processing circuitry to determine the second TAT at the first steady state airflow with the probe heater in the second on/off state, further comprising waiting a predetermined length of time to allow probe heat to reach a steady state condition.

7. The method of claim 5, and further comprising:
using the processing circuitry to control the probe heater to place the probe heater back into the first on/off heating state;
using the individual TAT probe and the processing circuitry to determine a third TAT at the first steady state airflow and with a probe heater again in the first on/off heating state;
using the processing circuitry to calculate a verification measured DHE as a difference between the second TAT and the third TAT; and
using the processing circuitry to verify the measured DHE by comparing the measured DHE to the verification measured DHE.

8. The method of claim 1, wherein using the processing circuitry to determine DHE with the individual TAT probe over the range of airflows as a function of the probe specific correction coefficient further comprises using the probe specific correction coefficient for the individual TAT probe to modify the nominal DHE function derived from the plurality of TAT probes of the particular type to generate a probe specific DHE function for the individual TAT probe.

9. The method of claim 8, wherein using the probe specific correction coefficient for the individual TAT probe to modify the nominal DHE function derived from the plurality of TAT probes of the particular type to generate the probe specific DHE function for the individual TAT probe further comprises multiplying the nominal DHE function by the probe specific correction coefficient.

10. The method of claim 1, wherein using the processing circuitry to determine DHE with the individual TAT probe over the range of airflows as a function of the probe specific correction coefficient further comprises using the probe specific correction coefficient for the individual TAT probe to modify DHE determined using the nominal DHE function derived from the plurality of TAT probes of the particular type.

11. A total air temperature (TAT) probe system having reduced de-icing heater error (DHE), comprising:
a first TAT probe having a heater and configured to measure TAT;
memory;
processing circuitry coupled to the memory and to the first TAT probe, the processing circuitry configured to perform steps comprising:
obtaining a nominal DHE function derived from a plurality of TAT probes of the same type as the first TAT probe;
calculating a probe specific correction coefficient for the first TAT probe as a function of a measured DHE for the first TAT probe at a first steady state airflow and a predicted DHE for the first TAT probe at the first steady state airflow, the predicted DHE for the first TAT probe at the first steady state airflow being determined using the nominal DHE function derived from the plurality of TAT probes of the same type as the first TAT probe; and
storing the probe specific correction coefficient in the memory for use in configuring the processing circuitry to determine de-icing heater error with the first TAT probe over a range of airflows as a function of the probe specific correction coefficient.

12. The TAT probe system of claim 11, wherein the processing circuitry is configured to calculate the probe specific correction coefficient for the first TAT probe while the first TAT probe is mounted on an aircraft.

13. The TAT probe system of claim 12, wherein the processing circuitry is configured to calculate the probe specific coefficient for the first TAT probe while the aircraft is on the ground.

14. The TAT probe system of claim 12, wherein the processing circuitry is configured to calculate the probe specific coefficient for the first TAT probe while the aircraft is flying at a cruising speed.

15. The TAT probe system of claim 11, wherein the processing circuitry is configured to store the probe specific correction coefficient in the memory by modifying the nominal DHE function derived from the plurality of TAT probes to generate a probe specific DHE function for the first TAT probe, and storing the probe specific DHE function for use in configuring the processing circuitry to determine DHE with the first TAT probe over the range of airflows.

16. A method of configuring a total air temperature (TAT) probe system to reduce de-icing heater error (DHE) for an individual TAT probe of a particular type, the method comprising:
using processing circuitry coupled to the individual TAT probe to obtain a nominal DHE function derived from a plurality of TAT probes of the particular type;
using the processing circuitry to calculate a probe specific correction coefficient for the individual TAT probe of the particular type as a function of a measured DHE at a first steady state airflow and a predicted DHE at the first steady state airflow, the predicted DHE at the first steady state airflow being determined using the nominal DHE function derived from the plurality of TAT probes of the particular type; and
storing the probe specific correction coefficient for use by the processing circuitry in determining de-icing heater error with the individual TAT probe over a range of airflows as a function of the probe specific correction coefficient.

17. The method of claim 16, wherein storing the probe specific correction coefficient for use by the processing circuitry further comprises using the probe specific correction coefficient to modify the nominal DHE function derived from the plurality of TAT probes of the particular type to generate a probe specific DHE function for the individual TAT probe, and storing the probe specific DHE function for use by the processing circuitry in determining DHE with the individual TAT probe over the range of airflows.

18. The method of claim 17, wherein using the probe specific correction coefficient to modify the nominal DHE function derived from the plurality of TAT probes of the particular type to generate the probe specific DHE function for the individual TAT probe further comprises multiplying the nominal DHE function by the probe specific correction coefficient.

19. The method of claim 16, wherein using the processing circuitry to calculate the probe specific correction coefficient for the individual TAT probe of the particular type comprises calculating the probe specific correction coefficient for the individual TAT probe while the probe is mounted on an aircraft.

20. The method of claim 19, wherein using the processing circuitry to calculate the probe specific correction coefficient further comprises:
   using the individual TAT probe and the processing circuitry to determine a first TAT at the first steady state airflow and with a probe heater in a first on/off heating state;
   using the processing circuitry to control the probe heater to place the probe heater in a second on/off heating state;
   waiting a length of time to allow probe heat to reach a steady state condition after the probe heater has been placed in the second on/off state;
   using the individual TAT probe and the processing circuitry to determine a second TAT at the first steady state airflow and with the probe heater in the second on/off heating state;
   using the processing circuitry to calculate the measured DHE as a function of a difference between the first TAT and the second TAT;
   using the processing circuitry to calculate the probe specific correction coefficient as a function of a ratio of the measured DHE and the predicted DHE at the first steady state airflow determined using the nominal DHE function for the plurality of TAT probes of the particular type.

* * * * *